(12) United States Patent
Morgan et al.

(10) Patent No.: US 9,206,966 B2
(45) Date of Patent: Dec. 8, 2015

(54) METHOD AND APPARATUS FOR OPTIMIZED PLANT GROWTH

(71) Applicant: Sensity Systems Inc., Sunnyvale, CA (US)

(72) Inventors: Dan Morgan, San Jose, CA (US); Steve Oster, San Jose, CA (US)

(73) Assignee: Sensity Systems Inc., Sunnyvale, CA (US)

( * ) Notice: Subject to any disclaimer, the term of this patent is extended or adjusted under 35 U.S.C. 154(b) by 189 days.

(21) Appl. No.: 13/862,253

(22) Filed: Apr. 12, 2013

(65) Prior Publication Data

US 2014/0069002 A1 Mar. 13, 2014

Related U.S. Application Data

(60) Provisional application No. 61/699,970, filed on Sep. 12, 2012.

(51) Int. Cl.
| | | |
|---|---|---|
| F21V 9/00 | (2015.01) | |
| F21V 21/005 | (2006.01) | |
| H05B 33/08 | (2006.01) | |
| A01G 7/04 | (2006.01) | |
| F21K 99/00 | (2010.01) | |
| H05B 37/02 | (2006.01) | |

(52) U.S. Cl.
CPC .............. *F21V 21/005* (2013.01); *A01G 7/045* (2013.01); *F21K 9/58* (2013.01); *H05B 33/0854* (2013.01); *H05B 37/0218* (2013.01); *H05B 37/0272* (2013.01)

(58) Field of Classification Search
CPC ......... F21V 21/005; F21K 9/58; A01G 7/045; H05B 33/0854; H05B 37/0218; H05B 37/0272
USPC ....................... 362/230–231, 249.02, 311.02, 362/563–564, 800, 805
See application file for complete search history.

(56) References Cited

U.S. PATENT DOCUMENTS

| | | | | |
|---|---|---|---|---|
| 8,074,397 B2* | 12/2011 | Yoneda et al. | ............ | 47/58.1 LS |
| 8,373,361 B2* | 2/2013 | Smits et al. | .................... | 315/297 |
| 2010/0020536 A1* | 1/2010 | Bafetti et al. | ................. | 362/231 |

* cited by examiner

*Primary Examiner* — Jason Moon Han
(74) *Attorney, Agent, or Firm* — Schwegman Lundberg & Woessner, P.A.

(57) ABSTRACT

A system for enabling controlled plant growth of plants in containers includes linear tracks spaced apart from each other by intervening supporting plates. Each track includes an array of blue and red LEDs affixed to heat sink that can slide along the track to be positioned in a desired arrangement to the container beneath it. A controller for the LEDs is positioned between every other pair of tracks to control adjacent arrays of LEDs. The controller controls the LEDs to provide light to the plants in the containers of desired intensity and wavelength.

10 Claims, 6 Drawing Sheets

METHOD AND APPARATUS FOR OPTIMIZED PLANT GROWTH

REFERENCE TO RELATED APPLICATION

The present application claims priority to U.S. Provisional Patent Application No. 61/699,970, filed Sep. 12, 2012, and entitled "System for Optimized Plant Growth," which is incorporated herein by reference in its entirety for all purposes.

BACKGROUND OF THE INVENTION

This application relates to technology for plant growth, and in particular to a lighting system for optimized plant growth under controlled conditions.

Growing plants in a controlled environment is now a well-known technology. Greenhouses produce large quantities of flowers and vegetables that are distributed throughout the world. More recently, plans are being grown in yet further controlled environments, for example, where all of the light and nutrients are provided in a closed, essentially windowless structure. While such systems can use incandescent lighting, the reduced power consumption and higher efficiency of light emitting diodes (LEDs) have made those the preferred choice for "indoor" greenhouses. We use the term "indoor" herein referred to systems in which plants are grown with minimal or no exposure to ambient lighting; that is, systems in which essentially all of the light provided for plant growth is provided from artificial sources such as light emitting diodes.

One example of this technology has been implemented by Ecopia Farms. Ecopia Farms grows herbs and vegetables in soil positioned in bins on racks inside a closed building. This allows control of light, water, and nutrients. The closed environment dramatically reduces the amount of water required, while the ability to grow the produce on shelves of stacked racks dramatically reduces the square footage required to produce a given amount of produce.

BRIEF SUMMARY OF THE INVENTION

Our system for enabling controlled growth of plants in containers includes a set of linear tracks spaced apart from each other. Supporting plates position the tracks in a parallel arrangement. Each track includes an array of blue and red LEDs affixed to heat sink which can slide along the track to be positioned in a desired position to the container beneath it. A controller for the LEDs is situated between every other pair of tracks to control adjacent arrays of LEDs. The controller controls the LEDs to provide light of desired intensity and wavelength to the plants.

By making each track identical to all other tracks and making each supporting plate identical to all other supporting plates, the apparatus may be enlarged or reduced in a modular manner to an appropriate size for the configuration of the plant growth system. Positioning a light sensor in proximity to the containers and coupling it to at least some of the controllers enables adjusting the intensity and wavelength of the light from the LEDs adjusted as needed for the particular plants and stage of plant growth. In addition, if the containers are labeled with identification tags, e.g. RFID, and also providing the apparatus with a tag sensor that detects the identification tags, the system can be controlled automatically. Furthermore, in some embodiments an environmental sensor is coupled to the controller to enable the controller to control an environmental variable such as temperature or humidity. Preferably each array of light emitting diodes includes only blue and red light emitting diodes mounted on a heat sink, with a temperature sensor also mounted on the heat sink in communication with the controller.

DETAILED DESCRIPTION OF THE INVENTION

Figure 1:
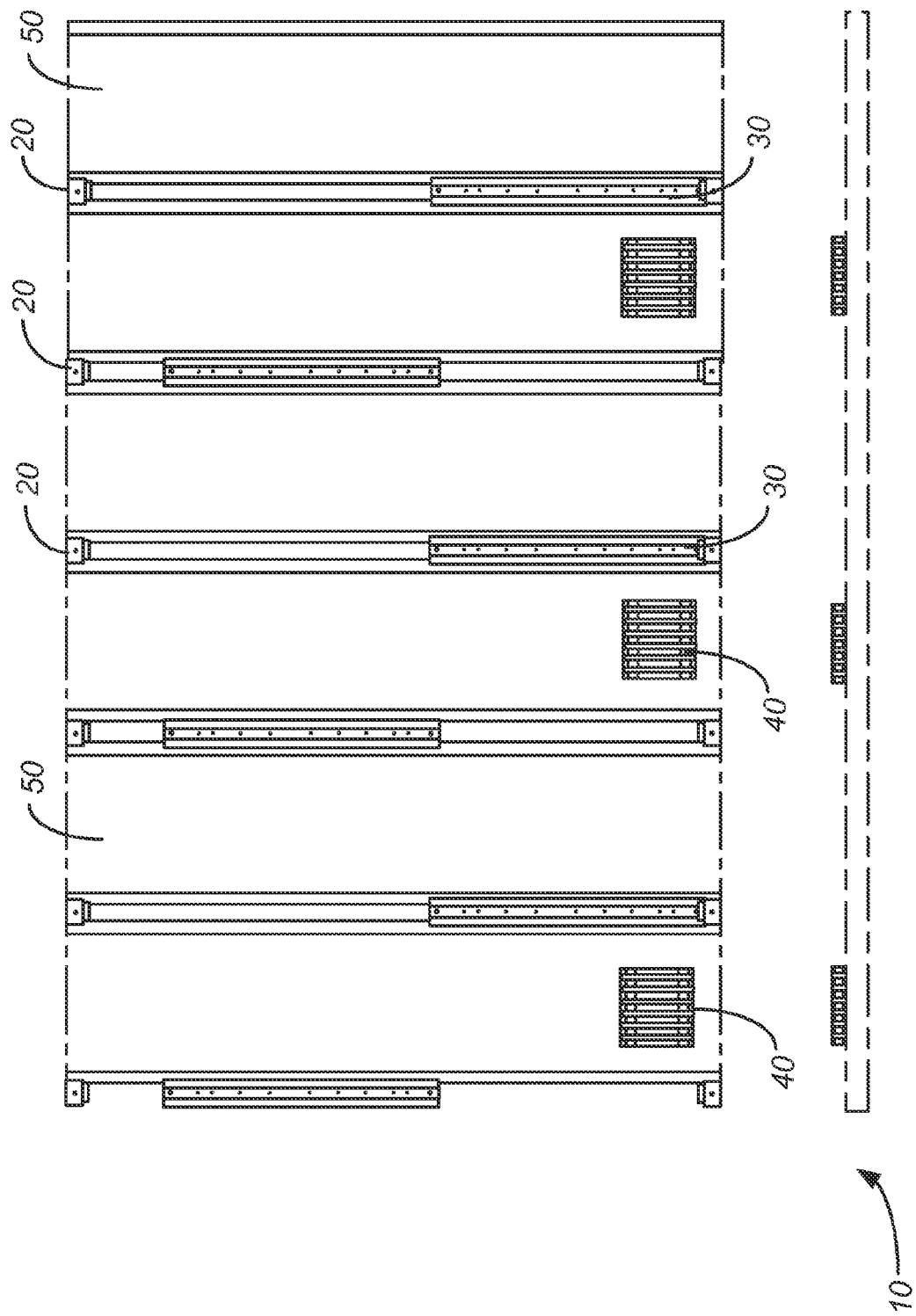
FIG. 1 is a top view of a light emitting diode assembly for plant growth.

FIG. 1 is a top view of a light emitting diode assembly 10 used for plant growth. Shown in the diagram are a series of tracks 20 having separated side rails. Positioned within each track is an light emitting diode (LED) assembly 30 which includes strips of LEDs affixed to a heat sink 30. The LED/heat sink assembly is preferably not affixed to the track 20, enabling it to be positioned in the track in a desired relationship to the container beneath it. The LEDs are electrically coupled to controllers 40 disposed on the plates 50 of assembly 10.

Each pair of tracks 20 is held in a fixed position with respect to other tracks by an intervening supporting plate 50. The plates 50 and tracks 20 enable a modular approach to the system in which additional subassemblies consisting of a plate and a track can be added to extend the length of the assembly as needed by the particular application.

Figure 2:
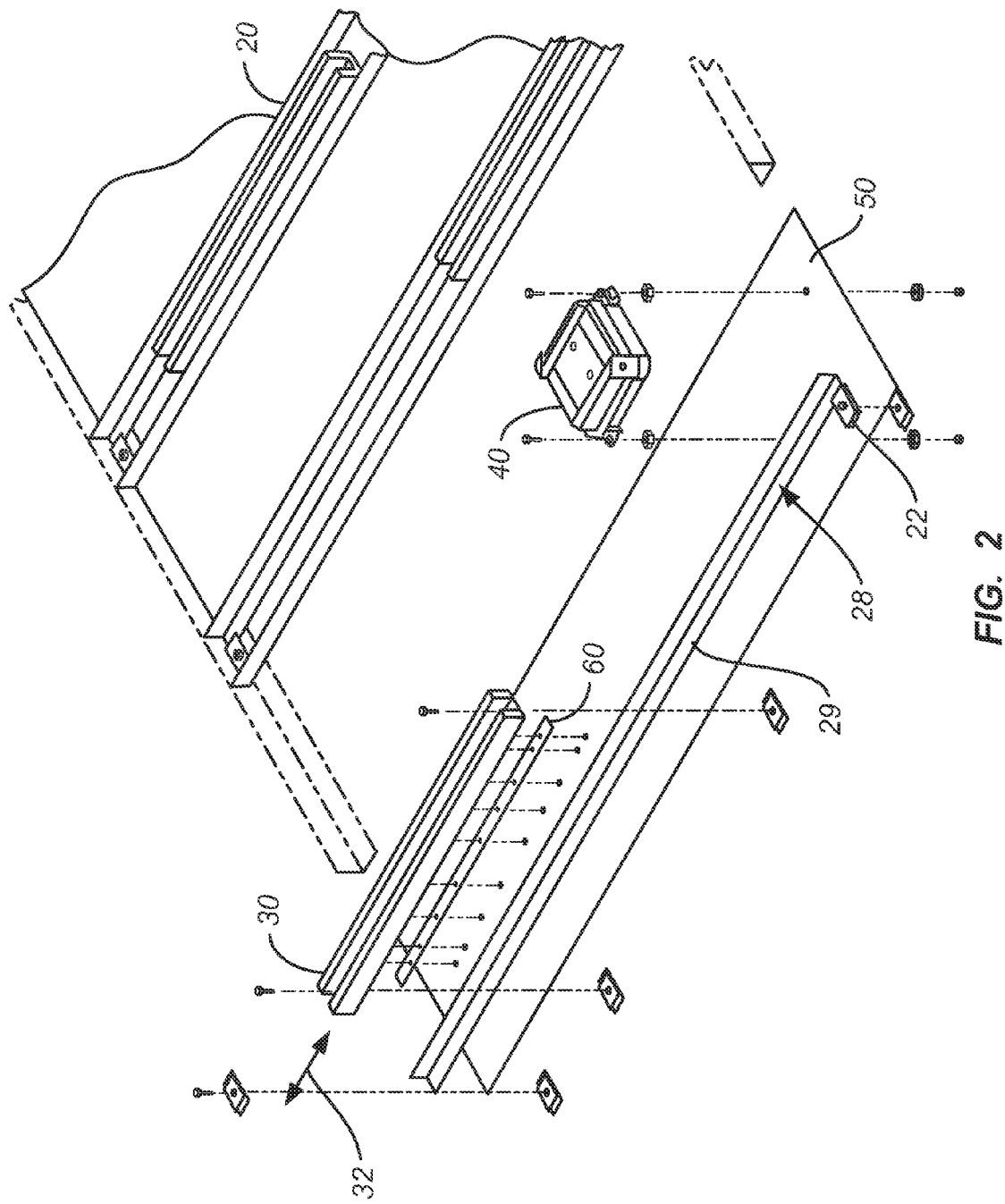
FIG. 2 is a perspective view of the assembly.

FIG. 2 is a perspective view illustrating the apparatus in more detail. As shown, the individual tracks 20 each consist of a pair of L-shaped side rails 28 mounted in opposition to each other to provide a lower surface 29 upon which the LED heat sink 30 is supported. Heat sink 30 is not affixed to the track 20, but may be moved to and fro in the track 20 as indicated by the bidirectional arrow 32.

Also illustrated is a strip-shaped circuit board of light emitting diodes 60 affixed to the lower surface of the heat sink 30. In the preferred embodiment the circuit board of LEDs consists of a linear row of blue LEDs disposed in parallel to a linear row of red LEDs. Wires, not shown, couple the strip of LEDs 60 to the controller 40. The intervening plates 50 between each pair of tracks provides an attachment surface for the controller 40, and for tabs 22 on track 20.

Figure 3:
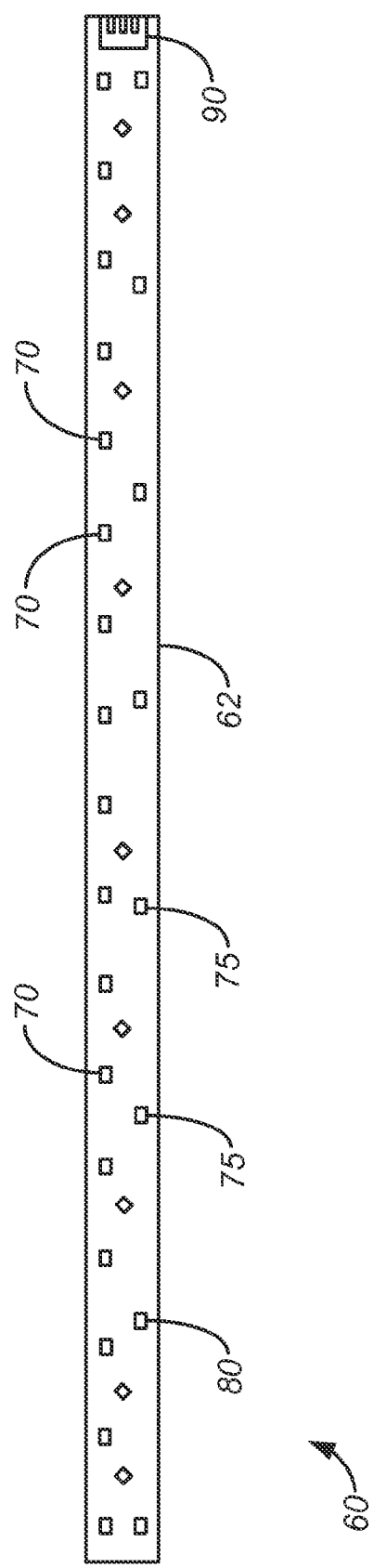
FIG. 3 is a diagram of an LED array strip.

FIG. 3 illustrates the LED circuit board 62 in more detail. Arranged in a linear manner along one edge of the circuit board 62 are LEDs 70 of a first color. Along the other edge of the circuit board are LEDs 75 of a different color. Preferably the two colors are red and blue. Each circuit board of LEDs 70, 75 also preferably includes a thyristor 80, or other sensor, for measuring the temperature of the assembled circuit board and heat sink. This allows more careful control of the temperature of the circuit board and LEDs, enabling longer life for the LEDs. A connector 90 coupled to the LEDs and the thyristor enables electrical connections to be made between the assembly 60 and the controllers 40.

Figure 4:
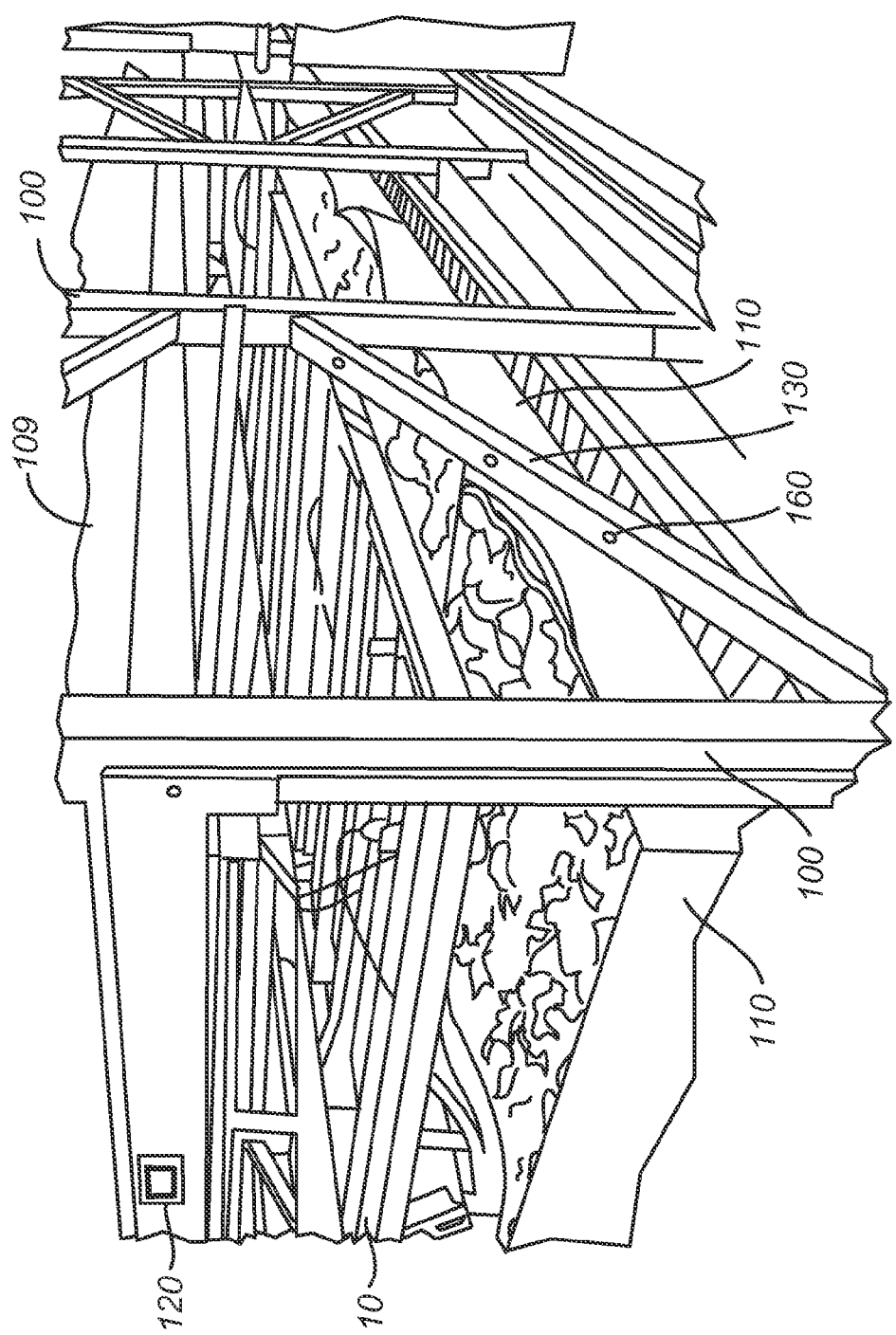
FIG. 4 is a perspective view of the assembly as implemented in a typical environment.

FIG. 4 is a diagram illustrating an application for the system described in FIGS. 1-3. As shown in the FIG. 4 a rack 100 supports a series of trays 110 in which plants are being grown. Each tray includes soil with appropriate nutrients and water added as necessary. Positioned linearly above the row of trays 110 is the apparatus 10 described in conjunction with FIGS. 1-3. Positioned above the apparatus 10 is another row of trays 109 supported on an additional portion 120 of the frame 100. Above that additional row of trays 109 is another LED assembly (not shown) to provide illumination to that row of trays.

A series of sensors 130 are mounted along the side rails of the frame 100 to detect the light emitted by the assembly 10, and to detect environmental conditions in the vicinity of the apparatus. The sensors 130 are coupled to the controllers 40 to provide the controllers information about the color and intensity of the light being emitted by the strips of light emitting diodes 60.

Generally most plants absorb primarily blue and red light. With appropriate experimental testing and calculations, the apparatus described here provides an optimal mix of wavelengths of light ranging from all blue to all red, each with a controlled intensity. For example, some plants grow best with primarily blue light at the beginning of their growth, and later predominately red light. The apparatus described here enables such control.

The sensors positioned along the trays provide information about the color of the light being received. In addition those sensors also can provide information about temperature, humidity, reflected light, carbon dioxide content, or other parameters of interest at the location of the trays with the plants. The sensors can provide feedback to control systems within the facility to raise or lower the temperature, humidity, carbon dioxide content, etc. In this manner, water use can be limited and power consumption made appropriate for the needs of the plant at the time.

Furthermore, in a preferred embodiment, an RFID tag can be added to each of the trays, and this identification sensed by an RFID sensors 160 on the frame 100. If the RFID tag information also provides information about the content of the tray, the light color and intensity of the LED emissions can be optimized for that particular plant type, even as the trays are moved to other locations on the supporting racks.

Figure 5:
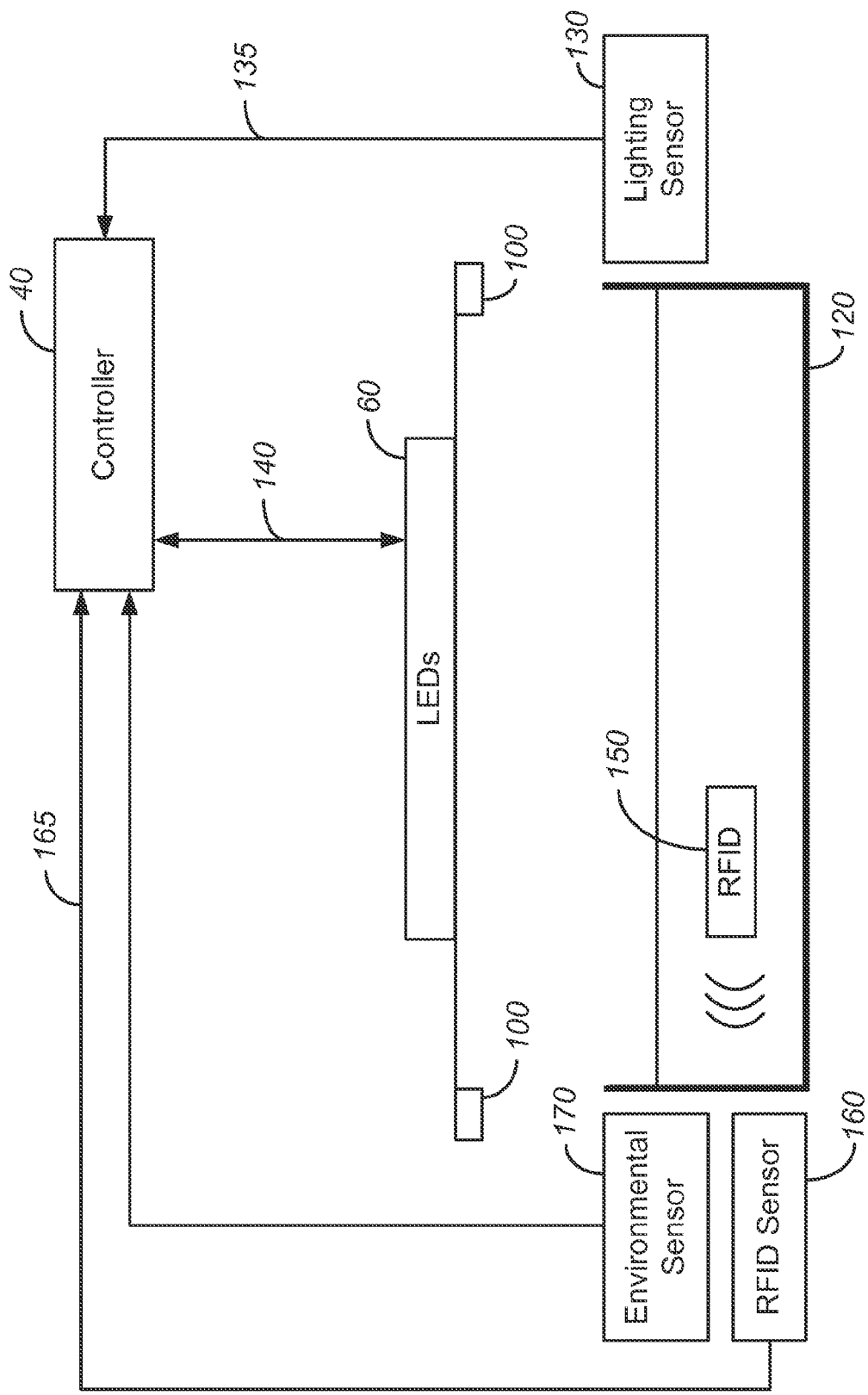
FIG. 5 is a block diagram illustrating a controller for the system.

FIG. 5 is a block diagram illustrating a control system for the apparatus illustrated in FIGS. 1-3. As shown the bins 110 containing plants are positioned under the strips of LEDs 60 which are supported by the frame 100. A light sensor (photo detector) 130 is positioned in proximity to the bin 110 to detect the light provided by the LEDs 60, and relay that information over a connection 135 to a controller 40. Depending upon the particular plants and the stage of their growth, controller 40 provide signals over bus 140 to control the color and intensity of the light by controlling the LEDs. The particular bin 110 and its contents are identified to the controller 40 by an RFID tag 150. The RFID tag communicates with an RFID sensor 160 that provides that information to a controller 40 using a connection 165. An environmental sensor 170 provides information to control 40 about desired environmental variables, for example, temperature, humidity, carbon dioxide, etc. By coupling controller 40 to fans, heaters, or other apparatus, the environmental conditions in the vicinity of the bins 110 can therefore also be controlled.

Figure 6:
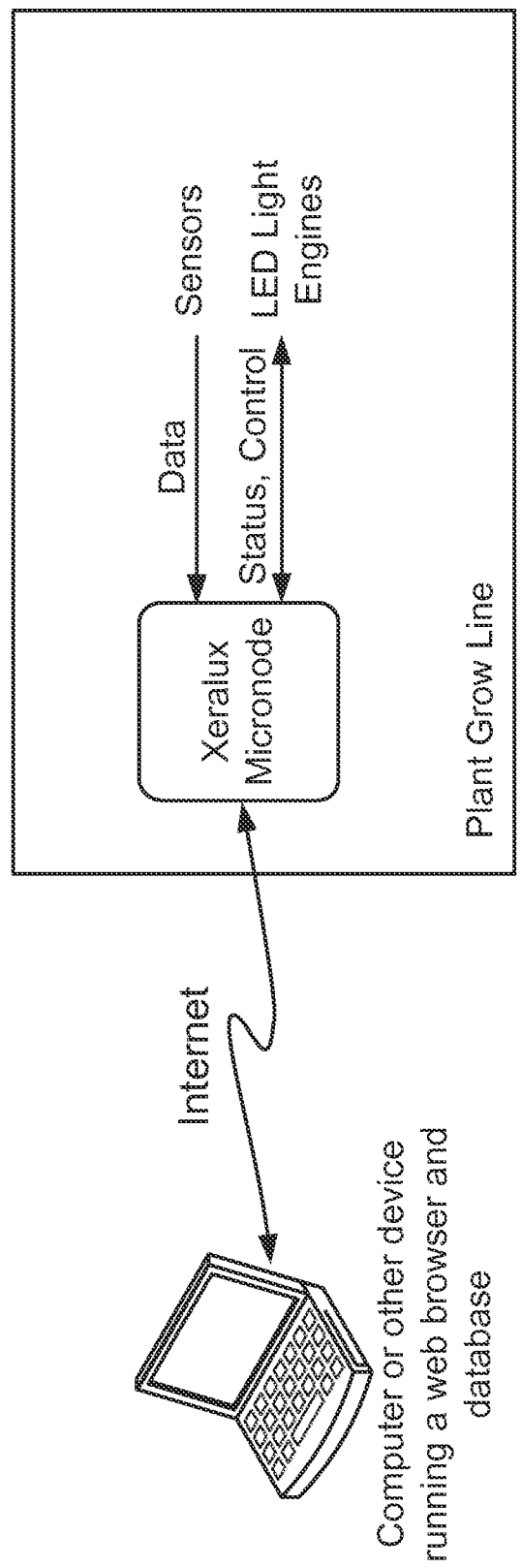
FIG. 6 is a diagram illustrating network control of the plant growth line.

FIG. 6 is a diagram illustrating networking of the plant growth system, and the ability to remotely control the system. As shown there, a computer or controller is coupled to the plant growth line using the Internet. The plant growth line includes sensors that report on conditions, for example, illumination intensity or illumination color, and relay that back to the computer. The LED light engines are then controlled based on the sensed conditions. The ability to sense and control parameters, such as light intensity and color, enables the plants to be grown under optimal conditions. Such a networked lighting and sensor system is explained in more detail in our co-pending U.S. Provisional Patent Application "Networked Lighting Infrastructure for Sensing Applications," Ser. No. 61/699,968, filed Sep. 12, 2012, the contents of which are incorporated herein by reference.

In the plant growth system described here, lighting control and sensing are provided using the techniques described in the above referenced patent application. In the plant growth system here, the sensors detect carbon dioxide levels, ambient temperature, ambient humidity, and both reflected light and light from the LED sources.

As shown in FIG. 6 a web browser-based interface enables the user to connect through the internet to view the status of the plant growth lines and their sensors, as well as control the lighting, for example, by turning lights on and off, changing their power levels, and changing their schedules. In some applications of the system described here, a database running on the computer shown in FIG. 6, or elsewhere, stores growing condition profiles for different plant species, e.g. respective red/blue LED power levels, on/off schedules, ventilation demands, etc. Desired parameters can be set and stored in a profile so that each time a plant growth line is planted with new seedlings, the user can select the appropriate profile from the database to be used by the system. The profile can contain all operating parameters and controls the LEDs until harvest time.

In addition to using the system to control the LED illumination sources, the software enables recording data from the sensors, enabling determination of the effects of various parameters over time. This enables plant growth research. Successful results enable new, more optimal, plant growth parameters for profiles to be determined.

Of course, while above we describe the structure and system described here in terms of an application for optimized plant growth, it will be apparent that the system described can have other uses, for example, in any circumstance in which controlling light output in a manufacturing process is important. For example, in the manufacture of products where photoresist is used, controlling the color and intensity of light can provide superior results.

What is claimed is:

1. Apparatus for providing controlled wavelength and intensity of light for use in a process involving exposure of plants to light, the apparatus comprising:

a plurality of supporting plates;

a plurality of plant containers, at least some of the plant containers are associated with identification tags;

a plurality of linear tracks spaced apart, disposed in a parallel arrangement, and separated from each other by the plurality of supporting plates;

a plurality of arrays of light emitting diodes (LEDs), each LED array being positioned in one of the tracks and above at least one of the plurality of plant containers;

light sensors positioned in proximity to the plurality of plant containers, the light sensors detect lighting conditions emitted from the plurality of arrays of LEDs;

tag sensors positioned in proximity to the plurality of plant containers, the identification tags communicatively coupled with the tag sensors;

at least one controller coupled to each of the plurality of arrays of LEDs and positioned on one of the plurality of supporting plates the at least one controller controls the plurality of arrays of the LEDs to provide controlled wavelength and intensity of light to the plants, and the at least one controller receives information from the tag sensors identifying contents of the associated plant containers; and a network interface coupled to the at least one controller to provide information detected from the light sensor and the tag sensor to a remote computing device over a network.

2. Apparatus as in claim 1 wherein each of the tracks is of a same size and shape, and each of the plates is of a same size and shape to enable enlarging the apparatus by adding additional tracks and additional plates to provide a desired size.

3. Apparatus as in claim 2 wherein:
each of the tracks comprises a pair of L-shaped members having a first length facing in opposition to each other;
the LEDs are affixed to a heat sink having a second length less than the first length; and
the heat sink is positioned in the track and is movable along the track.

4. Apparatus as in claim 1 wherein the at least one controller comprises a second plurality of controllers, the second plurality being one half the first plurality.

5. Apparatus as in claim 1 wherein a controller is disposed on every other supporting plate and coupled to one of the plurality of array of LEDs in tracks on each side of the controller.

6. Apparatus as in claim 1 wherein the identification tags represent radio-frequency identification (RFID) tags.

7. Apparatus as in claim 1 further comprising an environmental sensor coupled to the controller to enable the controller to control an environmental variable.

8. Apparatus as in claim 1 wherein each array of LEDs includes light emitting diodes that emit red light and light emitting diodes that emit blue light.

9. Apparatus as in claim 8 wherein each array of LEDs is mounted on a heat sink, and a temperature sensor is also mounted on the heat sink in communication with the at least one controller.

10. Apparatus for providing controlled wavelength and intensity of for use in a process involving exposure of plants to light, the apparatus comprising:

a plurality of supporting plates;

a plurality of plant containers;

a plurality of linear tracks spaced apart, disposed in a parallel arrangement and separated from each other by the plurality of supporting plates;

a plurality of arrays of light emitting diodes (LEDs), each LED array being positioned in one of the tracks and above at least one of the plurality of plant containers;

light sensors positioned in proximity to the plurality of plant containers, the light sensors detect lighting conditions emitted from the plurality of arrays of LEDs to determine selected wavelengths to which the plants are being exposed;

at least one controller coupled to each of the plurality of arrays of LEDs and positioned on one of the plurality of supporting plates, the at least one controller is configured to, in response to the detected lighting conditions from the light sensors, adjust the lighting conditions to improve growth conditions of the plants based on growing condition profiles for the plants, and a network interface coupled to the at least one controller to exchange information with a remote computing device, the network interface provides information detected from the light sensors to the remote computing device over a network and receives the growing condition profiles for the plants over the network.

* * * * *